United States Patent
Zhou (10) Patent No.: US 10,562,216 B2
(45) Date of Patent: Feb. 18, 2020

(54) INJECTION MOLD AND DEVICE FOR PREPARATION OF LIGHT GUIDE PLATE

(71) Applicants: BOE Technology Group Co., Ltd., Beijing (CN); BOE Optical Science and Technology Co., Ltd., Suzhou (CN)

(72) Inventor: Min Zhou, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

(*) Notice: Subject to any disclaimer, the term of this patent is extended or adjusted under 35 U.S.C. 154(b) by 352 days.

(21) Appl. No.: 15/501,831

(22) PCT Filed: Feb. 5, 2016

(86) PCT No.: PCT/CN2016/073687
§ 371 (c)(1),
(2) Date: Feb. 4, 2017

(87) PCT Pub. No.: WO2017/054390
PCT Pub. Date: Apr. 6, 2017

(65) Prior Publication Data
US 2017/0232650 A1 Aug. 17, 2017

(30) Foreign Application Priority Data
Sep. 29, 2015 (CN) .......................... 2015 1 0631432

(51) Int. Cl.
*B29C 45/43* (2006.01)
*B29C 45/73* (2006.01)
(Continued)

(52) U.S. Cl.
CPC .............. *B29C 45/43* (2013.01); *B29C 45/03* (2013.01); *B29C 45/40* (2013.01);
(Continued)

(58) Field of Classification Search
CPC ....... B29D 11/00663; B29L 2011/0075; B29K 2105/0067; B29C 45/43; B29C 45/03; B29C 45/73; B29C 45/4005; B29C 45/40
See application file for complete search history.

(56) References Cited

U.S. PATENT DOCUMENTS

| 8,246,340 B2 | 8/2012 | Chen |
| 2003/0096034 A1* | 5/2003 | Becker ................ B29C 45/4005 425/444 |

(Continued)

FOREIGN PATENT DOCUMENTS

| CN | 101293393 A | 10/2008 |
| CN | 101306572 A | 11/2008 |

(Continued)

OTHER PUBLICATIONS

International Search Report and Written Opinion of International Application No. PCT/CN2016/073687, dated Jul. 5, 2016, 10 pages.
(Continued)

*Primary Examiner* — Nahida Sultana
(74) *Attorney, Agent, or Firm* — Westman, Champlin & Koehler, P.A.

(57) ABSTRACT

An injection mold and a device for preparation of a light guide plate are provided by embodiments of the present disclosure. An injection mold, comprising a male mold and a female mold which cooperate with each other to define collectively a molding cavity adapted for molding a sheet component therein; a blowing device is provided in the male mold and configured to blow out gas with a predetermined pressure towards a bottom surface of the sheet component molded in the molding cavity to overcome at least partially a vacuum adsorption force between the bottom surface of the sheet component and an internal bottom surface of the molding cavity such that the sheet component is separated from the male mold. Therefore, the sheet component can be (Continued)

demoulded successfully and prevented from a relatively large warping deformation during a demoulding process such that the quality thereof can be guaranteed.

18 Claims, 6 Drawing Sheets

(51) Int. Cl.
    *B29C 45/40*     (2006.01)
    *B29C 45/03*     (2006.01)
    *B29D 11/00*     (2006.01)
    B29L 11/00     (2006.01)
    B29K 105/00     (2006.01)

(52) U.S. Cl.
    CPC .......... *B29C 45/4005* (2013.01); *B29C 45/73* (2013.01); *B29D 11/00663* (2013.01); *B29K 2105/0067* (2013.01); *B29L 2011/0075* (2013.01)

(56) References Cited

U.S. PATENT DOCUMENTS

2005/0031729 A1*   2/2005   Hattori ................ B29C 45/4005
                                                                                                             425/556
2014/0008824 A1*   1/2014   Niu ...................... B29C 31/006
                                                                                                             264/1.1
2016/0185021 A1*   6/2016   Olaru ..................... B29C 45/73
                                                                                                             264/40.1
2018/0272579 A1*   9/2018   Abate .................... B29C 45/16

FOREIGN PATENT DOCUMENTS

| | | |
|---|---|---|
| CN | 101992514 A | 3/2011 |
| CN | 102120357 A | 7/2011 |
| CN | 102335985 A | 2/2012 |
| CN | 202480321 U | 10/2012 |
| CN | 203046176 U | 7/2013 |
| CN | 103302813 A | 9/2013 |
| CN | 204322418 U | 5/2015 |
| CN | 204505704 U | 7/2015 |
| CN | 204658867 U | 9/2015 |
| CN | 105108977 A | 12/2015 |
| JP | 1991-108522 A | 5/1991 |

OTHER PUBLICATIONS

English translation of Box No. V of the Written Opinion for the International Searching Authority for International Application No. PCT/CN2016/073687, 2 pages.
First Office Action, including Search Report, for Chinese Patent Application No. 201510631432.7, dated Dec. 14, 2016, 18 pages.
Second Office Action for Chinese Patent Application No. 201510631432.7, dated Apr. 12, 2017, 20 pages.
Third Office Action from Chinese Patent Application 201510631432.7, dated Aug. 22, 2017, 21 pages.

\* cited by examiner

INJECTION MOLD AND DEVICE FOR PREPARATION OF LIGHT GUIDE PLATE

CROSS-REFERENCE TO RELATED APPLICATION

This application is a Section 371 National Stage application of International Application No. PCT/CN2016/073687, filed on Feb. 5, 2016, which has not yet published, entitled "INJECTION MOLD AND DEVICE FOR PREPARATION OF LIGHT GUIDE PLATE", and claims priority to Chinese Patent Application No. 201510631432.7 filed on Sep. 29, 2015 in the State Intellectual Property Office of China, the disclosures of which are incorporated herein by reference in their entirety.

BACKGROUND OF THE INVENTION

Field of the Invention

Embodiments of the present disclosure relate to the technical field of injection molding technology, and in particular to an injection mold for injection molding a sheet component and a device for preparation of a light guide plate.

Description of the Related Art

Figure 1:
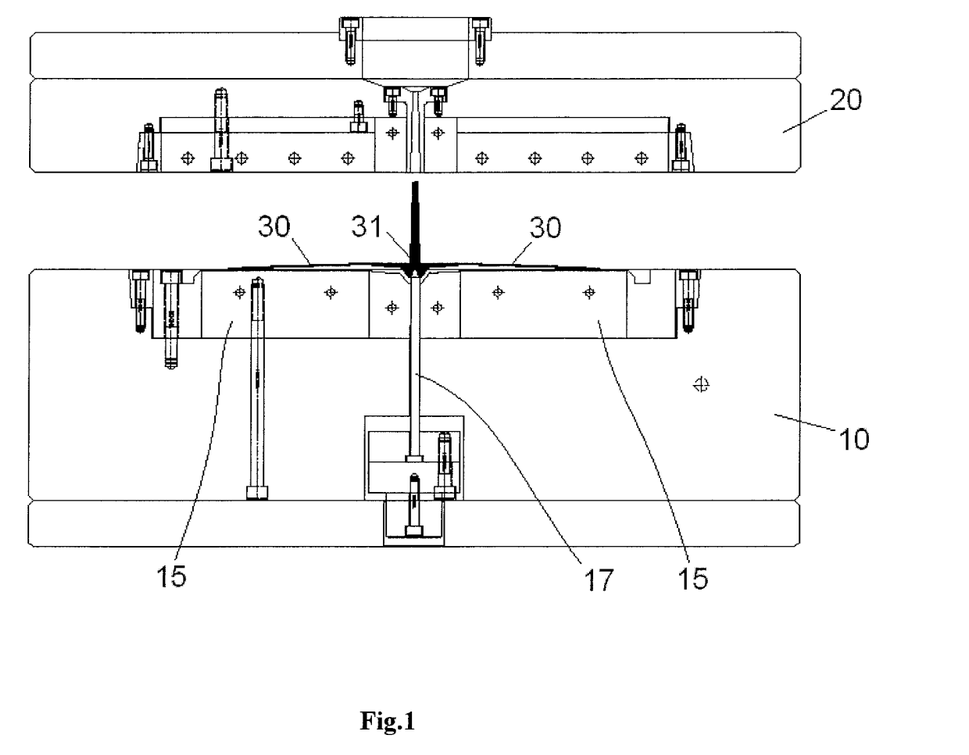
FIG. 1 illustrates an injection mold for molding a light guide plate.
Figure 2:
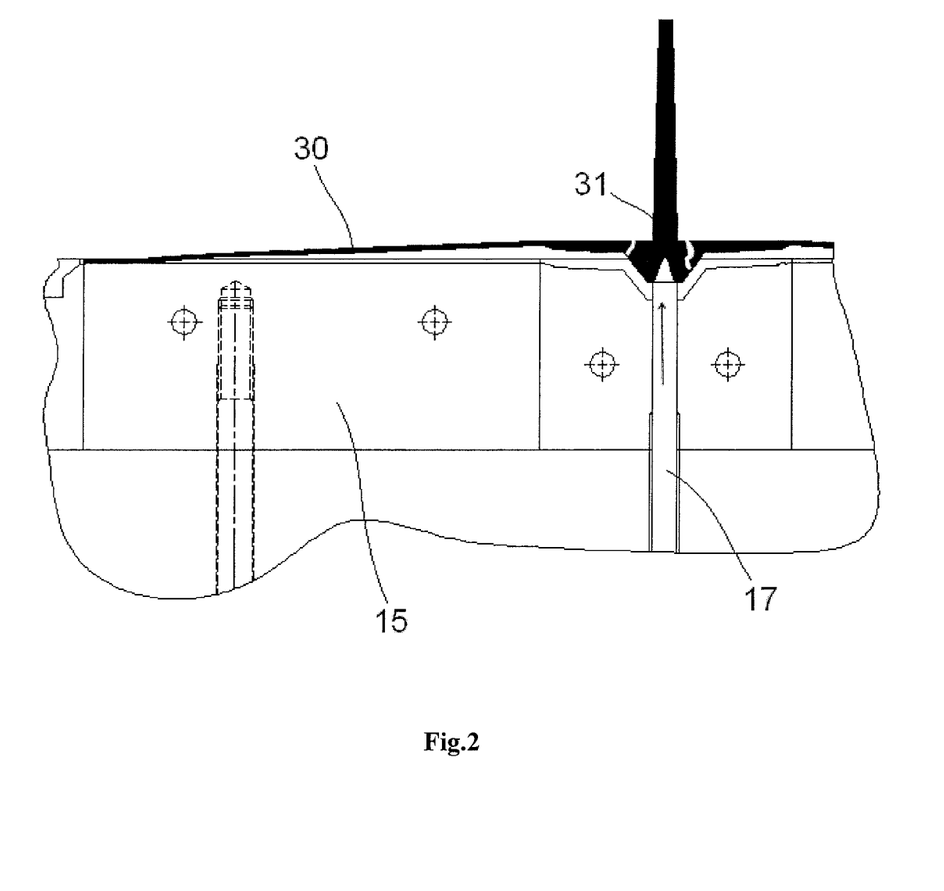
FIG. 2 illustrates a schematic partial enlarged view at an ejector pin of the injection mold as illustrated in FIG. 1.

A conventional injection mold for forming a sheet component e.g., a light guide plate used in the display field by injection molding, is illustrated in FIGS. 1 and 2, wherein FIG. 1 illustrates an injection mold in the prior art for molding a light guide plate 30; and FIG. 2 illustrates a schematic partial enlarged view at an ejector pin of the injection mold as illustrated in FIG. 1. An injection mold for injection molding a light guide plate 30 typically comprises a male mold 10 and a female mold 20 which cooperates with the male mold 10, both of which define collectively therebetween a molding cavity adapted for forming a sheet component therein. After the light guide plate 30 is formed with the injection mold, it is necessary to separate the light guide plate 30 from the male mold 10. In the prior art, as illustrated in FIG. 1 and FIG. 2, the light guide plate 30 is separated from the male mold 10, typically in a manner of pushing inwards the injection mold (e.g., pushing upwards) directly at a bottom portion of the light guide plate 30 by an ejector pin 17. Since the light guide plate 30 has higher optical requirements upon preparation thereof, then it is specified that there should be no tracks formed by pushing upwards with the ejector pin on surfaces of the light guide plate 30. Therefore, as illustrated in FIGS. 1 and 2, in the prior art, the ejector pin 17 may only be provided at a molded gate section 31 which is formed within a runner gate of the injection mold in communication with the molding cavity and integrally connected with the light guide plate 30.

However, in the prior art, as illustrated in FIG. 1 and FIG. 2, before a molded light guide plate 30 is pushed out of a mold cavity between the male mold and the female mold, a gap between the light guide plate 30 and a core insert 15 of the male mold 10 is nearly in a vacuum condition, resulting in a relatively strong adsorption force existing between the light guide plate 30 and the core insert 15 of the male mold 10. Therefore, when the light guide plate 30 is pushed upwards by the ejector pin 17 provided at a lower side of the molded gate section 31, the light guide plate 30 may be deformed to be warped, or even deformed to a degree that may be hard to restore to a flat condition, such that the quality of the light guide plate 30 is degraded. Besides, in a case that there is an excessively large adsorption force between the light guide plate 30 and the core insert 15 of the male mold 10, a breakage may thus be easily incurred at a junction between the molded gate section 31 and the light guide plate 30 under a pushing upwards action of the ejector pin 17, such that the molded gate section 31 is separated and detached from the light guide plate; and once the molded gate section 31 is detached from the light guide plate 30, the light guide plate 30 may not be pushed out of and removed from the male mold 10 only by means of the pushing upwards action of the ejector pin 17, resulting in a shutdown operation required to perform removal and cleaning processes of debris, rather than a normal demoulding process of the light guide plate 30, such that the operation of a production line is interrupted and thus a normal production thereof is influenced.

SUMMARY OF THE INVENTION

Embodiments of the present disclosure have been made to overcome or alleviate at least one aspect of the above mentioned disadvantages and/or shortcomings, by providing an injection mold which demoulds a light guide plate successfully and prevents the light guide plate from a relatively large warping deformation during a demoulding process such that the quality thereof may be guaranteed.

According to an aspect of the exemplary embodiment of the present application, there is provided an injection mold, comprising a male mold and a female mold which cooperate with each other to define collectively a molding cavity adapted for molding a sheet component therein; a blowing device is provided in the male mold and configured to blow out gas with a predetermined pressure towards a bottom surface of the sheet component molded in the molding cavity to overcome at least partially a vacuum adsorption force between the bottom surface of the sheet component and an internal bottom surface of the molding cavity such that the sheet component is separated from the male mold.

According to another aspect of the exemplary embodiment of the present application, there is provided a device for preparation of a light guide plate, comprising the aforementioned injection mold.

In each of the exemplary embodiments of the disclosure, the blowing device is provided in the injection mold and is adapted to blow out gas with a predetermined pressure towards a bottom surface of the sheet component molded in the molding cavity of the injection mold so as to overcome a vacuum adsorption force between the bottom surface of the sheet component and a bottom surface of the molding cavity, such that the sheet component may be prevented from a relatively large warping deformation during a demoulding process, thus guaranteeing the quality of the sheet component. With the device for preparation of a light guide plate of the aforementioned injection mold, a light guide plate with high quality may be manufactured.

Since the device for preparation of a light guide plate comprises the injection mold provided in the first aspect of the disclosure, then the device for preparation of a light guide plate necessarily has the same beneficial technical effect as that of the injection mold, which will not be repeatedly set forth herein.

BRIEF DESCRIPTION OF THE DRAWINGS

The above and other features and advantages of the present disclosure will become more apparent and a more comprehensive understanding of the present disclosure may be obtained, by describing in detail exemplary embodiments disclosure thereof with reference to the accompanying drawings, in which.

DETAILED DESCRIPTION OF PREFERRED EMBODIMENTS OF THE INVENTION

Exemplary embodiments of the present disclosure will be described hereinafter in detail with reference to the attached drawings, wherein the like reference numerals refer to the like elements. The present disclosure may, however, be embodied in many different forms, and thus the detailed description of the embodiment of the disclosure in view of attached drawings should not be construed as being limited to the embodiment set forth herein; rather, these embodiments are provided so that the present disclosure will be thorough and complete, and will fully convey the general concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general technical concept of the present disclosure, there is provided an injection mold, comprising a male mold and a female mold which cooperate with each other to define collectively a molding cavity adapted for molding a sheet component therein; a blowing device is provided in the male mold and configured to blow out upwards gas with a predetermined pressure from a bottom surface of the sheet component molded in the molding cavity to overcome at least partially a vacuum adsorption force between the bottom surface of the sheet component and an internal bottom surface of the molding cavity which is abutted against by the bottom surface of the sheet component such that the sheet component is separated from the male mold.

Figure 3:
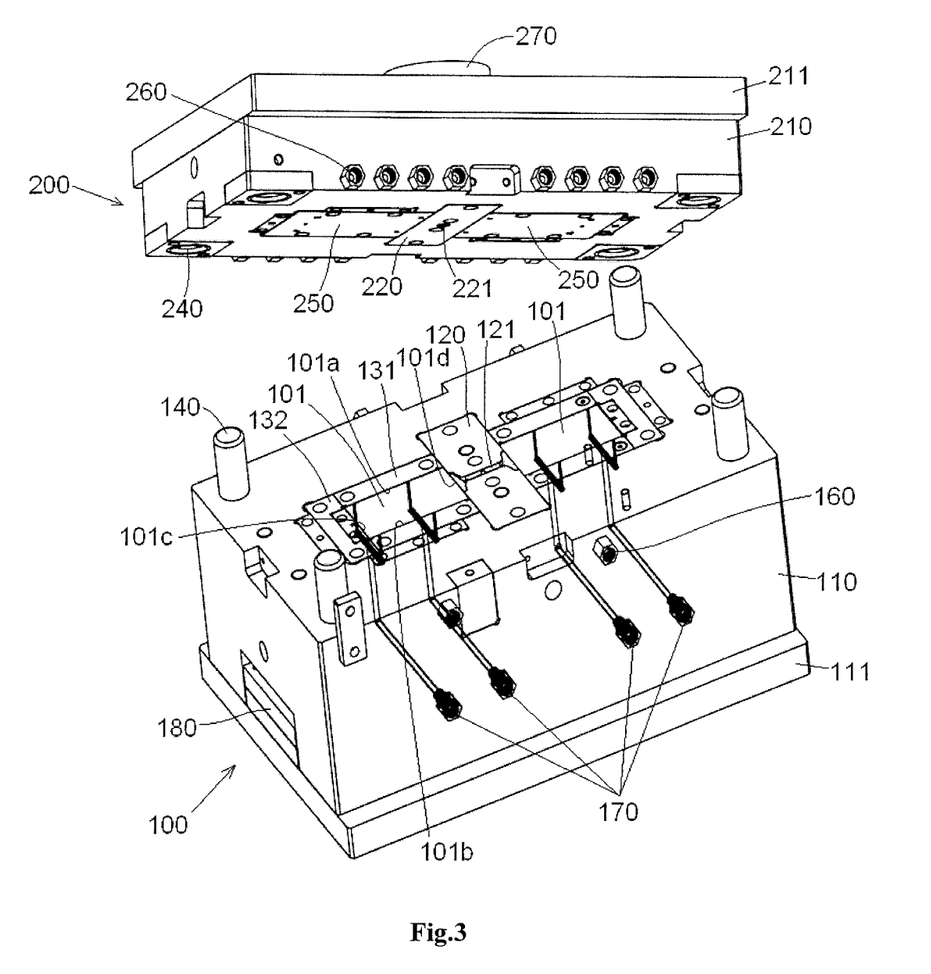
FIG. 3 illustrates a schematic perspective view of an injection mold according to an exemplary embodiment of the disclosure.

As illustrated in FIG. 3, an injection mold is provided by an specific exemplary embodiment of the disclosure, especially an injection mold which is adapted to mold a sheet component, e.g., a light guide plate; the injection mold comprising a female mold 200 and a male mold 100 which is adapted to cooperate and fit with the female mold 200 so as to define collectively a molding cavity 101 which is closed and adapted for forming a sheet component 300 therein.

Figure 4:
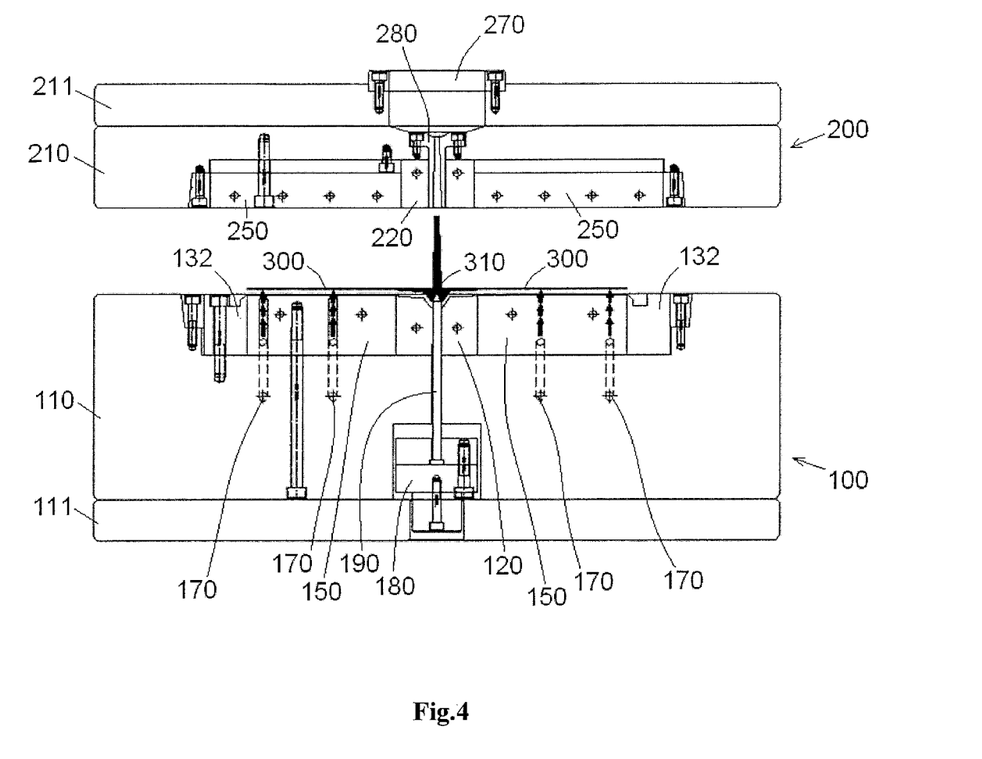
FIG. 4 illustrates a front planar view of an injection mold according to an exemplary embodiment of the disclosure.
Figure 5:
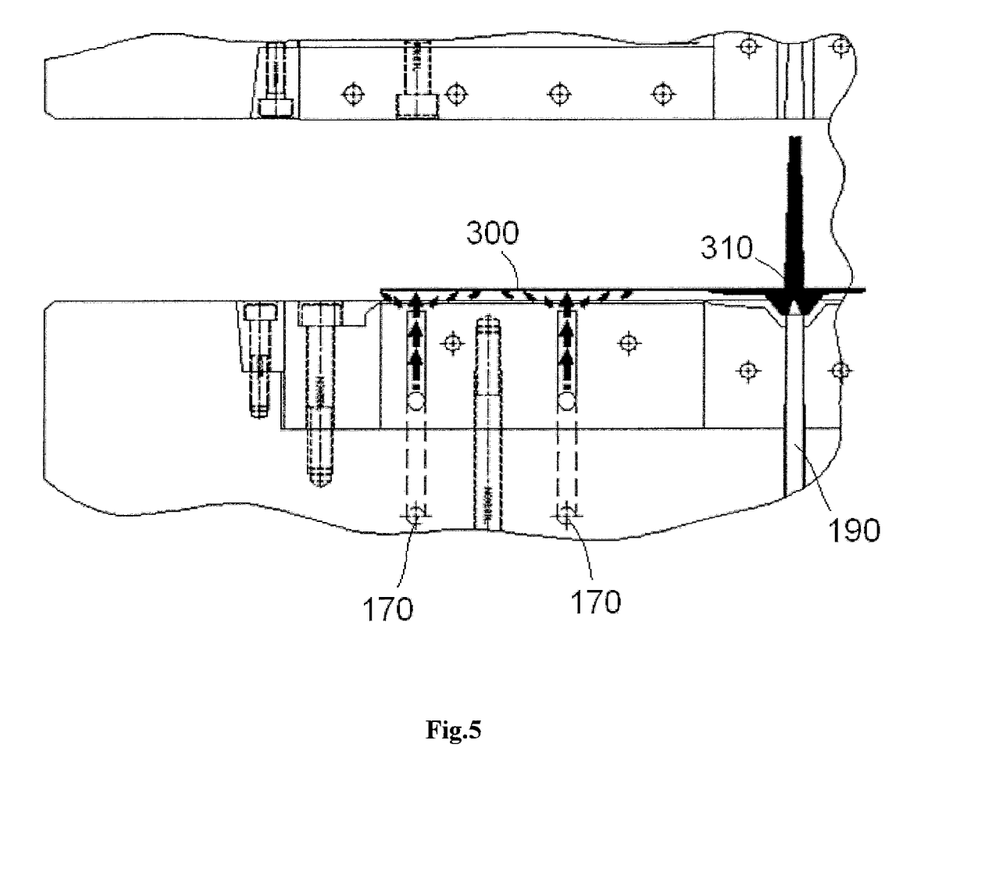
FIG. 5 illustrates a schematic partial enlarged view at a middle part of the injection mold as illustrated in FIG. 4, where its male mold and female mold are arranged to be adjacent to each other.

FIG. 4 illustrates a planar view of an injection mold according to an exemplary embodiment of the disclosure; and FIG. 5 illustrates a schematic partial enlarged view at a middle part of the injection mold as illustrated in FIG. 4, where its male mold and female mold are arranged to be adjacent to each other.

As illustrated in FIGS. 3, 4 and 5, in an illustrated exemplary embodiment of the disclosure, a plurality of blowing devices 170 are provided in the male mold 100 and adapted to blow out gas with a predetermined pressure towards a bottom surface of the sheet component 300 molded in the molding cavity 101 collectively defined by the male mold 100 and the female mold 200 which cooperate and fit with each other so as to overcome at least partially a vacuum adsorption force between the bottom surface of the sheet component 300 and an internal bottom surface of the molding cavity 101 which is abutted against by the bottom surface of the sheet component 300 (i.e., a surface of the core insert of the male mold 100 which abuts against the bottom surface of the sheet component 300) such that the sheet component 300 is separated from the male mold 100.

In an exemplary embodiment of the invention, for example, the aforementioned sheet component 300 is a light guide plate used in a backlight module of a display screen. However, the disclosure is not limited thereto, and the sheet component 300 further comprises sheet molded particle for other applications.

As illustrated in FIGS. 3, 4 and 5, in an illustrated exemplary embodiment of the disclosure, the male mold 100 is further provided with a thruster device configured to push upwards on a lower side of a molded gate section 310, which molded gate section is formed within a runner gate 121 in communication with the molding cavity 10 and integrally connected with the sheet component 300, such that the molded gate section 310 and the sheet component connected therewith integrally are separated from the male mold 100.

As illustrated in FIGS. 3, 4 and 5, in an illustrated exemplary embodiment of the disclosure, the thruster device comprises an ejector pin 190 and a driver 180 which is configured to drive the ejector pin 190 to move upwards. The ejector pin 190 pushes upwards the molded gate section 310 under the actuation of the driver 180. It should be noticed that, after the sheet component 300 is demoulded, the molded gate section 310 is required to be cut off from the sheet component 300.

Figure 6:
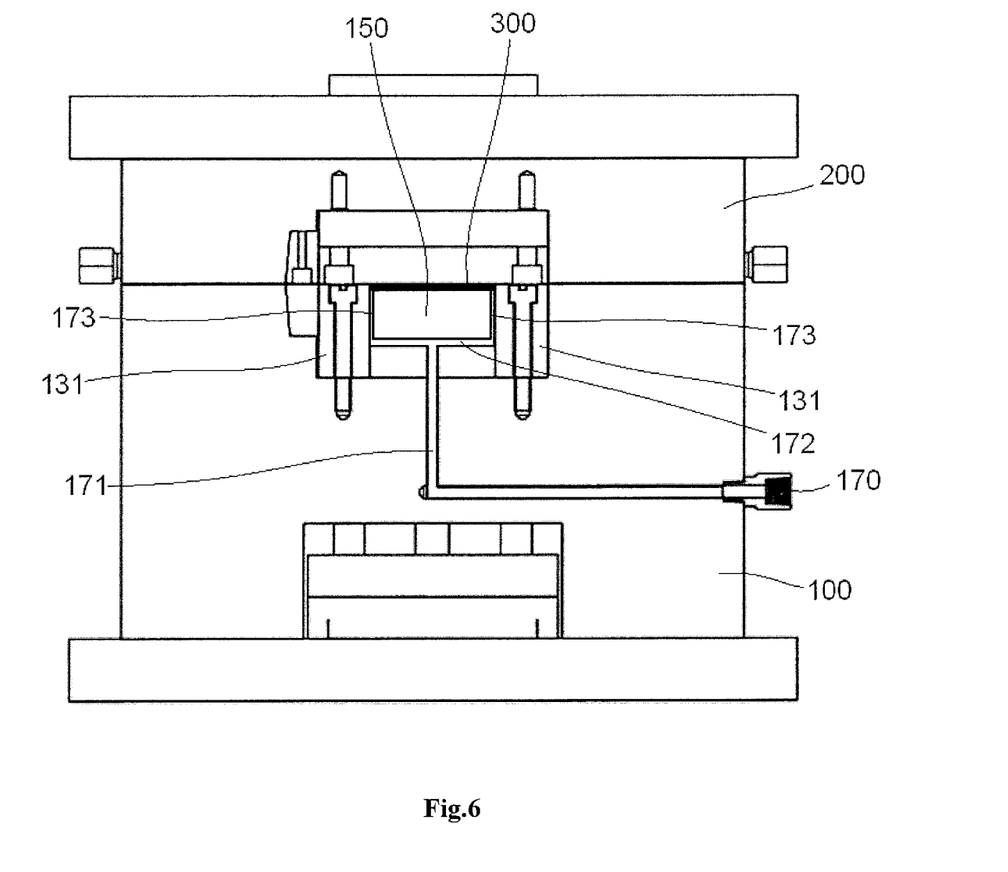
FIG. 6 illustrates a side cross sectional view of the injection mold according to an exemplary embodiment of the disclosure.

FIG. 6 illustrates a side cross sectional view of the injection mold according to an exemplary embodiment of the disclosure, seen from one side thereof.

As illustrated in FIG. 3 to FIG. 6, in an exemplary embodiment of the disclosure, the blowing device 170 further comprises gas passageway sections 171, 172, 173 which are leading to an external gas source, formed within the male mold 100 and in communication with one another to form collectively a continuous gas passageway, the gas passageway is provided with a gas outlet located on a bottom surface of the molding cavity 101 and a gas inlet located on an outer wall of the male mold 100. And the gas source communicates with the gas inlet of the gas passageway which is formed on the outer wall of the male mold 100 by the gas passageway sections 171, 172, 173 collectively. In an embodiment of the disclosure, the aforementioned external gas source is an air compressor, for example.

As illustrated in FIGS. 3 and 4, in an illustrated exemplary embodiment of the disclosure, the male mold 100 which defines a lower side of the molding cavity 101 comprises a male mold body 110 having a top recess, a core insert 150 which is embedded in the top recess of the male mold body 110, male mold frame splits 131, 132 which are embedded around the core insert 150, and a male mold gate insert block 120 which is arranged at a middle part of the core insert 150 and transverse thereto; and the female mold 200 which defines an upper side of the molding cavity 101 comprises a female mold body 210 having a bottom recess, a cavity insert 250 which is embedded in the bottom recess of the female mold body 210 of the female mold 200, and a female mold gate insert block 220 which is arranged at a middle part of the cavity insert 250, transverse thereto and is aligned with the male mold gate insert block.

As illustrated in FIGS. 3 and 4, in an illustrated exemplary embodiment of the disclosure, a top surface of the core insert 150 defines a bottom wall of the molding cavity 101, and a bottom surface of the cavity insert 250 defines a top wall of the molding cavity 101; internal surfaces of the male mold frame splits 131, 132 define two side walls 101a, 101b in a length direction of the molding cavity 101 and an outer end wall 101c which is arranged transversely between the two side walls 101a, 101b and away from the male mold gate insert block 120 at a middle part of the core insert 150; and side surfaces of the male mold gate insert block 120 located transverse to the core insert and corresponding side surfaces of the mating female mold gate insert block 220 which is located transverse to the cavity insert define cooperatively an internal end wall 101d of the molding cavity 101.

As illustrated in FIGS. 3 and 4, in an illustrated exemplary embodiment of the disclosure, the male mold frame splits comprise side wall splits 131 which are adapted to define the two side walls in the length direction of the molding cavity 101 and an end wall split 132 which is adapted to define the outer end wall of the molding cavity 101.

As clearly illustrated in FIG. 6, in an illustrated exemplary embodiment of the disclosure, the gas passageway which is formed by aforementioned gas passageway sections 171, 172, 173 in communication with one another mainly comprises: a first passageway section 171, which is formed within the male mold body 110 of the male mold 100; a second passageway section 172, which is formed within the core insert 150 and in communication with the first passageway section 171; and an air-blowing tank 173, which is formed within the core insert 150 and in communication with the second passageway section 172. An outlet of the air-blowing tank 173 is formed on the bottom surface of the molding cavity 101 and configured to function as a gas outlet of the gas passageway sections 171, 172, 173, and a cross sectional area of the air-blowing tank 173 is configured to be less than that of either of the first passageway section 171 and the second passageway section 172, such that the cross sectional area of the gas passageway is constricted to be convergent to accelerate a gas flow therethrough.

As illustrated in FIGS. 3~6, especially as illustrated in FIG. 3, in an illustrated exemplary embodiment of the disclosure, by way of example, the gas passageway formed by the gas passageway sections 171, 172, 173 comprises a plurality of the air-blowing tanks 173; and the second passageway section 172 is configured to distribute gas with a predetermined pressure which flows therein to the plurality of the air-blowing tanks 173.

In another exemplary embodiment as illustrated in FIG. 6, the gas passageway formed by the gas passageway sections 171, 172, 173 comprises two air-blowing tanks 173 which are formed on the two side walls of the core insert 150 and extend vertically upwards.

As illustrated in FIG. 6, in the exemplary embodiment, there are relatively strict requirements on the depth of the air-blowing tanks 173 within the side walls of the core insert 150 in a vertical upward direction. If the depth of the air-blowing tanks 173 is excessively large, then a gradient of a change rate of the gas flow in a direction of the depth may be lower than that in a case of the air-blowing tanks 173 with a shorter depth, resulting in that plastics material filled into the molding cavity 101 may easily flow into the air-blowing tanks 173 (i.e., a phenomena of plastics leakage occurs), which may form pillar-shaped projections on a lower surface of the sheet component 300 and thus bring about adverse effect on the molding quality of the sheet component 300. On the other hand, if the depth of the air-blowing tanks 173 is too small to pass gas flow therethrough, then an unsmooth/obstructed air blowing may be incurred. In order to ensure that neither the plastics leakage nor the unsmooth air blowing may take place, in an exemplary embodiment of the disclosure, a depth of the air-blowing tanks 173 in a direction perpendicular to the side walls of the core insert 150 is typically configured to be larger than 0.008 mm and smaller than 0.015 mm As illustrated in FIGS. 3~6, especially as illustrated in FIG. 3, in an illustrated exemplary embodiment of the disclosure, by way of example, a plurality of the molding cavities 101 are defined between the male mold 100 and the female mold 200, which molding cavities may be provided with a narrow fluid passage communicating thereamong at the runner gate 121, such that a plurality of the sheet components 300 are injection molded simultaneously. In the illustrated exemplary embodiment, as illustrated in FIGS. 3~6, two molding cavities are defined between the male mold 100 and the female mold 200. However, the disclosure is not limited thereto, by way of example, three or more of the molding cavities 101 may be defined between the male mold 100 and the female mold 200.

Correspondingly, as illustrated in FIGS. 3~6, in an illustrated exemplary embodiment of the disclosure, each of the plurality of the molding cavities 101 is provided with a plurality of the blowing devices 170 so as to blow out gas with a predetermined pressure towards the bottom surface of the sheet component 300 formed within each molding cavity 101 simultaneously. By way of example, in the illustrated exemplary embodiment, as illustrated in FIG. 3, each molding cavity 101 is provided with two blowing devices 170. However, the disclosure is not limited thereto, and each molding cavity 101 may be provided with three or more blowing devices 170.

As illustrated in FIG. 3, in the illustrated exemplary embodiment, a plurality of alignment guiding pillars 140 which extend vertically upwards are formed at edges of the top surface of the male mold body 110. A plurality of alignment guiding holes 240 each of which aligns with corresponding one of the plurality of alignment guiding pillars 140 respectively are formed at edges of the bottom surface of the female mold body 210. The alignment guiding pillars 140 are adapted to be inserted into corresponding alignment guiding holes 240 when assembled such that the male mold 100 and the female mold 200 are assembled in alignment with each other precisely.

During a process of molding the sheet component 300, the plastics material which is filled into the molding cavity 101 in a molten state may produce a large amount of heat. In order to prevent the male mold 100 and the female mold 200 from thermal deformation or damage, in an exemplary embodiment of the disclosure, as illustrated in FIG. 3, a male mold water cooling device 160 is provided on the male mold 100 (e.g., on side walls thereof) for cooling the male mold 100; and a female mold water cooling device 260 is provided on the female mold 200 (e.g., on side walls thereof) for cooling the female mold 200.

In an exemplary embodiment of the disclosure, as illustrated in FIG. 3 and FIG. 4, the male mold body 110 of the male mold 100 is mounted and fixed onto a male mold mounting plate 111 located on a bottom surface thereof; and the female mold body 210 of the male mold 200 is mounted and fixed onto a female mold mounting plate 211 located on a top surface thereof.

In an exemplary embodiment of the disclosure, as illustrated in FIG. 3, the female mold mounting plate 211 is provided with a connection flange 270 for connection with an output end of an injection molding machine; and as illustrated in FIG. 4, a filling nozzle component 280 is provided within the female mold 200 so as to fill an injection molding material outputted by a the output end of the injection molding machine into the runner gate 121.

Various steps of the processes for manufacturing the sheet component 300 with the illustrated injection mold are set forth in details as below, with reference to FIGS. 3~5.

First of all, an injection mold is provided as illustrated in FIG. 3. The injection mold comprises the female mold 200 and the male mold 100 which is adapted to cooperate and fit with the female mold 200. Once the male mold 100 and the female mold 200 align with each other and are assembled together snugly, the male mold 100 and the female mold 200 define collectively one or more molding cavities 101, each of which is closed and adapted for forming a sheet component 300 therein (as illustrated in FIG. 4).

Then, molten plastics are poured and filled into the closed injection mold(s) via the filling nozzle component 280, and flow into the one or more molding cavities 101 of the injection mold via the runner gate 121 respectively. Once the volume(s) of the one or more molding cavities 101 is/are entirely filled with the plastics material, the injection of plastics is stopped.

Next, once the plastics material which is filled within the injection mold is cooled and cured, the female mold 200 of the injection mold is removed vertically upwards, as illustrated in FIG. 4.

Finally, as illustrated in FIG. 4 and FIG. 5, the blowing devices 170 are activated to blow out gas with a predetermined pressure towards the bottom surface of the sheet component 300 molded in the molding cavity through the gas passageway to overcome at least partially the vacuum adsorption force between the bottom surface of the sheet component 300 and an internal bottom surface of the molding cavity 101 which is abutted against by the bottom surface of the sheet component, such that the bottom surface of the sheet component 300 is separated from an upper surface of the core insert 150 of the male mold 100 (i.e., the internal bottom surface of the molding cavity 101); meanwhile, the thruster device is also activated so as to push upwards the lower side of the molded gate section 310, which lower side is connected with the sheet component, by means of the ejector pin 190 of the thruster device under an actuation of the driver 180, such that the whole sheet component 300 is separated from the male mold 100 successfully.

In the aforementioned exemplary embodiments of the invention, as illustrated in FIG. 4~FIG. 6, the blowing device 170 blows out gas with a predetermined pressure towards the sheet component 300 directly, and the gas then flows upwards along the air-blowing tank 173 under pressure and is quickly diverted to a position of a adsorption surface between the sheet component 300 and the core insert 150 when the gas flow is obstructed by the sheet component 300, such that the pressure of the gas flow would at least partially overcome the vacuum adsorption force between the sheet component 300 and the core insert 150. As such, the sheet component 300 may be demoulded successfully by a collective pushing upwards action of the ejector pin 190 and an ascending gas flow with a predetermined pressure. During the demoulding process, since the sheet component 300 is subject to the pushing upwards action across its whole lower surface, rather than a single-point pushing upwards action only at the lower side of the molded gate section in the mould of the prior art, such that a distribution of the upward pushing forces is relatively uniform across the whole sheet component 300 and thus the sheet component 300 is prevented from a relatively large warping deformation, resulting in a relatively high dimensional stability and an improved quality thereof. Besides, since the vacuum adsorption between the sheet component 300 and the core insert 150 is completely or at least partially eliminated by the ascending gas flow, then the necessary pushing upward force(s) provided by the ejector pin 190 may be decreased. Therefore, a connection portion between the sheet component 300 and the molded gate section 310 in connection with each other may not be broken by the pushing upwards action of the ejector pin 190 which acts locally, without any interruption operation or any shutdown operation for a removal processing of debris, ensuring a normal production.

Even though not illustrated, a device for preparation of a sheet-shaped light guide plate is also disclosed by the exemplary embodiments of the invention, comprising the aforementioned injection mold, for forming an injection molded light guide plate; and by way of example, the device further comprises a cutting device adapted to cut the light guide plate which is injection molded; and a grinding device adapted to grind/polish the light guide plate which was subject to a cutting processing; or other post-processing device(s), for example.

Among others, it should be noticed that, even if above exemplary embodiments facilitate a completed demoulding by overcoming the vacuum adsorption between the molded sheet component and the core insert with an ascending gas flow which blows vertically upwards; however, However, the disclosure is not limited thereto, and the completed demoulding of the sheet component (e.g., a light guide plate) which is injection molded may be assisted otherwise, e.g., at least one of the first passageway section, the second passageway section and the air-blowing tank within the gas passageway is extending in an inclined upwards manner. More specifically, by way of example, a blowing operation is performed by a gas passageway extending obliquely upwards from a bottom portion of the mold; or otherwise the demoulding process may be assisted by carrying out the blowing operation alternatively or additionally by means of a gas inlet provided in an end wall of the male mold of the mold, air-blowing tank(s) (which is for example configured to be obliquely upwards) provided on the end wall of the core insert 150 rather than on the side walls thereof.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments of the general concept of the present application have been shown and described, it would be appreciated by those skilled in the art that various changes or modifications may be made in these embodiments without departing from the principles and spirit of the disclosure, the scope of which is defined in the claims and their equivalents.

It should be noted that the terms, such as "comprising", "including" or "having", should be understood as not excluding other elements or steps and the word "a" or "an" should be understood as not excluding plural of said elements or steps. Further, any reference number in claims should be understood as not limiting the scope of the present application.

What is claimed is:

1. An injection mold, comprising a male mold and a female mold which cooperate with each other to define collectively a molding cavity adapted for molding a sheet component therein,
wherein a blowing device is provided in the male mold and configured to blow out gas with a predetermined pressure towards a bottom surface of the sheet component molded in the molding cavity to overcome at least partially a vacuum adsorption force between the bottom surface of the sheet component and an internal bottom surface of the molding cavity such that the sheet component is separated from the male mold;
wherein the male mold further comprises a thruster device configured to push upwards a lower side of a molded gate section, which molded gate section is formed within a runner gate of the injection mold in communication with the molding cavity and integrally connected with the sheet component, such that the sheet component is separated from the male mold.

2. The injection mold according to claim 1,
wherein the sheet component is a light guide plate used in a backlight module of a display screen.

3. The injection mold according to claim 1,
wherein the thruster device comprises an ejector pin and a driver which is configured to drive the ejector pin to push upwards the molded gate section.

4. The injection mold according to claim 1,
wherein the blowing device further comprises a gas passageway which is formed within the male mold and is provided with a gas outlet located on a bottom surface of the molding cavity and a gas inlet located on an outer wall of the male mold, and a gas source which communicates with the gas inlet of the gas passageway.

5. The injection mold according to claim 4,
wherein the male mold which defines a lower side of the molding cavity comprises a male mold body having a top recess, a core insert which is embedded in the top recess of the male mold body, male mold frame splits which are embedded around the core insert, and a male mold gate insert block which is arranged at a middle part of the core insert and transverse thereto; and
wherein the female mold which defines an upper side of the molding cavity comprises a female mold body having a bottom recess, a cavity insert which is embedded in the bottom recess of the female mold body, and a female mold gate insert block which is arranged at a middle part of the cavity insert, transverse thereto and is aligned with the male mold gate insert block.

6. The injection mold according to claim 5,
wherein a top surface of the core insert defines a bottom wall of the molding cavity, and a bottom surface of the cavity insert defines a top wall of the molding cavity;
wherein internal surfaces of the male mold frame splits define two side walls in a length direction of the molding cavity and an outer end wall which is located transversely between the two side walls and away from the male mold gate insert block; and
wherein side surfaces of the male mold gate insert block located transverse to the core insert and corresponding side surfaces of the female mold gate insert block located transverse to the cavity insert define cooperatively an internal end wall of the molding cavity.

7. The injection mold according to claim 6,
wherein the male mold frame splits comprise side wall splits which are adapted to define the two side walls in the length direction of the molding cavity and an end wall split which is adapted to define the outer end wall of the molding cavity.

8. The injection mold according to claim 6,
wherein the gas passageway comprises:
a first passageway section, which is formed within the male mold body;
a second passageway section, which is formed within the core insert and in communication with the first passageway section; and
an air-blowing tank, which is formed within the core insert and in communication with the second passageway section;
wherein an outlet of the air-blowing tank is formed on the bottom surface of the molding cavity and configured to function as a gas outlet of the gas passageway, and a cross sectional area of the air-blowing tank is configured to be less than that of either of the first passageway section and the second passageway section.

9. The injection mold according to claim 8,
wherein the gas passageway comprises a plurality of the air-blowing tanks; and
wherein the second passageway section is configured to distribute gas with a predetermined pressure which flows therein from the second passageway section to the plurality of the air-blowing tanks.

10. The injection mold according to claim 9,
wherein the gas passageway comprises two air-blowing tanks which are formed on the two side walls of the core insert and extend vertically upwards.

11. The injection mold according to claim 10,
wherein a depth of the air-blowing tanks within the side walls of the core insert in a vertical upward direction is configured to be larger than 0.008 mm and smaller than 0.015 mm.

12. The injection mold according to claim 1,
wherein a plurality of the molding cavities are defined between the male mold and the female mold such that a plurality of the sheet components are injection molded simultaneously.

13. The injection mold according to claim 12,
wherein each of the plurality of the molding cavities is provided with a plurality of the blowing devices so as to blow out gas with a predetermined pressure towards the bottom surface of the sheet component formed within each molding cavity simultaneously.

14. The injection mold according to claim 1,
wherein a plurality of alignment guiding pillars which extend vertically upwards are formed at edges of the top surface of the male mold body;
wherein a plurality of alignment guiding holes each of which aligns with corresponding one of the plurality of alignment guiding pillars respectively are formed at edges of the bottom surface of the female mold body; and
wherein the alignment guiding pillars are adapted to be inserted into corresponding alignment guiding holes when assembled such that the male mold and the female mold are assembled in alignment.

15. The injection mold according to claim 1,
wherein a male mold water cooling device is provided on the male mold for cooling the male mold; and
wherein a female mold water cooling device is provided on the female mold for cooling the female mold.

16. The injection mold according to claim 1,
wherein the male mold body is mounted and fixed onto a male mold mounting plate located on a bottom surface thereof; and
wherein the female mold body is mounted and fixed onto a female mold mounting plate located on a top surface thereof.

17. The injection mold according to claim 16,
wherein the female mold mounting plate is provided with a connection flange for connection with an output end of an injection molding machine; and
wherein a filling nozzle component is provided within the female mold so as to fill an injection molding material outputted by the output end of the injection molding machine into a runner gate of the injection mold.

18. The injection mold according to claim 9,
wherein at least one of the first passageway section, the second passageway section and the air-blowing tank in the gas passageway is extending in an inclined upwards manner.

* * * * *